(12) United States Patent
Brehm et al.

(10) Patent No.: US 7,053,166 B2
(45) Date of Patent: May 30, 2006

(54) PREPARATION OF ORGANICALLY MODIFIED POLYORGANOSILOXANES

(75) Inventors: Isabella Brehm, Ratingen (DE); Ingrid Eissmann, Gelsenkirchen (DE); Heike Lüther, Mülheim (DE); Philipp Tomuschat, Essen (DE)

(73) Assignee: Goldschmidt GmbH, Essen (DE)

( * ) Notice: Subject to any disclaimer, the term of this patent is extended or adjusted under 35 U.S.C. 154(b) by 54 days.

(21) Appl. No.: 10/804,511

(22) Filed: Mar. 19, 2004

(65) Prior Publication Data

US 2004/0186259 A1    Sep. 23, 2004

(30) Foreign Application Priority Data

Mar. 21, 2003   (DE)   ................................. 103 12 634

(51) Int. Cl.
   *C08G 77/06*   (2006.01)
(52) U.S. Cl. ............................. 528/14; 528/29; 528/31
(58) Field of Classification Search .................... None
   See application file for complete search history.

(56) References Cited

U.S. PATENT DOCUMENTS 5,147,965 A      9/1992   Ichinohe et al.
6,593,436 B1 *   7/2003   Austin et al. ................ 528/479

FOREIGN PATENT DOCUMENTS

EP       0 475 440 B1    2/1995

OTHER PUBLICATIONS

J. Boyer et al., "Heterogeneous Catalysis in the Presence of Salts and Without Solvent", Journal of Organometallic Chemistry, vol. 157, pp. 153-162, 1978.
S. Maifield et al., "Activation of silanes by Grubbs' carbene complex $Cl_2(Pcy_3)_2Ru=CHPh$: dehydrogenative condensation of alcohols and hydrosilylation of carbonyls", Tetrahedron Letters, vol. 43, pp. 6363-6366, 2002.
J. Blackwell et al., "$B(C_6F_5)_3$-Catalyzed Silation of Alcohols: A Mild, General Method for Synthesis of Silyl Ethers", J. Org. Chem., vol. 64, pp 4887-4892, 1999.

* cited by examiner

*Primary Examiner*—Marc Zimmer
(74) *Attorney, Agent, or Firm*—Frommer Lawerence & Haug LLP

(57) ABSTRACT

The present invention provides a process for reacting
A) polyorganosiloxanes which contain —Si(H) units and are of the general formula (I)

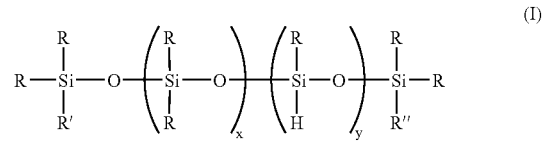

with
B) a mono- or polyhydric alcohol,
which comprises using small amounts of a mixture which consists of at least one acid and at least one salt of an acid as a catalyst.

24 Claims, No Drawings

PREPARATION OF ORGANICALLY MODIFIED POLYORGANOSILOXANES

RELATED APPLICATIONS

This application claims priority to German application Serial No. 103 12 634.1, filed Mar. 21, 2003, herein incorporated by reference.

FIELD OF THE INVENTION

The present invention provides a process for preparing organically modified polyorganosiloxanes, in which a hydrogen atom bonded to the silicon is replaced by an alkoxide radical using a catalytic mixture consisting of at least one acid and at least one salt of an acid.

BACKGROUND OF THE INVENTION

Siloxanes are used in numerous technical applications because of their unique properties such as water repellency, interface activity, temperature stability, etc. These include the stabilization of polyurethane foams, use as emulsifiers, in release coatings and many others.

However, in order to be able to utilize the unique properties of siloxanes in technical applications, it is usually necessary to modify the siloxane with organic groups, since the pure silicone is generally incompatible with aqueous or organic formulations.

In order to bond organic groups to a siloxane, there are in principle two possible binding types available. In the first case, a carbon atom is bonded directly to a silicon atom (SiC bond formation); in the second case, a carbon atom is bonded to the silicon atom via an oxygen atom (SiOC bond formation). The SiC bond formation usually results from a hydrosilylation reaction, while there are several possible methods available for the formation of an SiOC bond. Classically, SiOC bonds are formed by the reaction of a siloxane with a leaving group (for example halogen) bonded to the silicon atom and an alcohol. Particularly chlorosiloxanes are widely used for this reaction type. However, chlorosiloxanes are difficult to handle, since they are extremely reactive. The use of chlorosiloxanes is also associated with the disadvantage that the hydrogen chloride formed in the course of the reaction restricts handling to corrosion-resistant plants and leads to ecological problems. In addition, organic chlorine compounds may be formed in the presence of chlorosiloxanes and alcohols and are not desirable for toxicological reasons. In addition, it is not easy to achieve a quantitative conversion in the reaction of a chlorosiloxane with an alcohol. Frequently, bases which serve as HCl scavengers have to be used in order to achieve good conversions. The use of these bases results in the formation of large amounts of salt burden which in turn cause problems in their removal on the industrial scale.

A possible alternative to this process is to react alcohols with siloxanes in which hydrogen is bonded directly to the silicon atom (SiH siloxanes). Under suitable conditions, the SiOC bond is formed only with elimination of hydrogen and there is no salt burden. This dehydrogenative condensation proceeds only in the presence of a catalyst. U.S. Pat. No. 5,147,965 refers to a process which is described in the Japanese patent specification JP-A-4-819941 and in which an SiH siloxane is reacted with an alcohol with the addition of alkali metal hydroxides or alkali metal alkoxides. A disadvantage of this process which is mentioned is that although these conditions are suitable for catalyzing a dehydrogenative condensation, they result equally in equilibration and therefore rearrangement of the siloxane basic structure. If the intention is not to change the siloxane basic structure in the course of the reaction, this method is unsuitable. In contrast, EP-B-0 475 440 describes a process in which SiH siloxanes are reacted with an alcohol with the addition of an organic acid in the presence of a Pt salt. Under these conditions, there is no rearrangement of the siloxane basic structure. However, it is unavoidable for the reaction that large amounts of organic acid (from 0.1 to 1 mol based on the alcohol), toluene as a solvent and a platinum salt are used. Since both the toluene and the organic acid are undesired in the end product, they have to be removed on completion of reaction. Platinum salts are not only costly, but are also not entirely safe from a physiological point of view. Specifically in the field of the cosmetics industry, there is a desire for products which are free of platinum.

For the preparation of alkoxysilanes by alcoholyzing monomeric hydrosilanes, the literature describes the heterogeneous catalysis of salts, for example potassium tartrate, phthalate or formate. The reactions require the equimolar use of the salt (based on SiH units) and only succeed at high temperatures of approx. 180° C. (J. Boyer, R. J. P. Corriu, R. Perz, C. Reye J. Organomet. Chem. 1978, 157, 153–162). Both the severe conditions and the large amounts of salt required make the reaction unattractive for the industrial scale.

Very recently, the literature has reported two further methods for dehydrogenative condensation of monomeric hydrosilanes with alcohols. Firstly, tris(pentafluorophenyl) borane may be used as the catalyst for the reaction, in which case from 1 to 8 mol % of the compound is used as a catalyst and operation is effected in a solvent (J. M. Blackwell, K. L. Foster, V. H. Beck, W. E. Piers J. Org. Chem. 1999, 64, 4887–4892). A disadvantage of this catalyst is that it remains in the reaction product and that its biodegradability is inadequate. In addition, boron compounds are frequently undesired, since they are physiologically active.

Secondly, the reaction can be catalyzed by the Grubbs catalyst $Cl_2(PCy_3)_2Ru=CHPh$, in which case 0.5 mol % of the compound is used as a catalyst. In this process, operation may be effected without solvent. Disadvantages of this catalyst are the high cost and the fact that it is very sensitive toward oxidation, so that operation has to be effected under rigorous exclusion of air. In addition, the catalyst is active not only in the desired dehydrogenative condensation, but also in the homogeneously catalyzed hydrogenation, so that the hydrogen formed during the condensation can hydrogenate double bonds present in the substrate (S. V. Maifeld, R. L. Miller, D. Lee Tetrahedron Lett. 2002, 43, 6363–6366).

There is therefore a need to find a technically simple process which allows siloxanes to be selectively reacted with alcohols, without degrading the siloxane basic structure, without chlorine and without solvent, working with an inexpensive catalyst system which is physiologically safe and can be removed in a simple manner.

In the effort to overcome the disadvantages of the prior art and to provide a process which enables an advantageous alternative preparation of alkoxy-modified siloxanes, it has now been found that this aim can be achieved by the reaction of an SiH siloxane with an alcohol in the presence of a small amount of a catalytic mixture which consists of at least one acid and at least one salt of an acid.

DESCRIPTION OF THE INVENTION

The invention therefore provides a process for reacting
A) polyorganosiloxanes which contain —Si(H) units and are of the general formula (I)

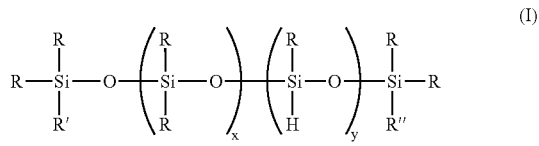

in which at least one hydrogen atom is bonded to a silicon atom;
R is one or more identical or different radicals selected from linear or branched, saturated, mono- or polyunsaturated alkyl, aryl, alkylaryl or arylalkyl radicals, preferably having from 1 to 20 carbon atoms, in particular from 1 to 10 carbon atoms, haloalkyl groups, preferably having from 1 to 20 carbon atoms, siloxy groups and triorganosiloxy groups,
R' and R" are each independently H or R,
x is an integer from 0 to 300, preferably from 0 to 100, and y independently thereof, is an integer from 0 to 80, in particular from 0 to 50; with
B) an alcohol which is selected from the group of the linear or branched, saturated, mono- or polyunsaturated, aromatic, aliphatic-aromatic mono- or polyalcohols, polyether mono- or -polyalcohols, amino alcohols, in particular N-alkyl, arylamino-EO, —PO alcohols, N-alkyl or arylamino alcohols, each of which may optionally bear other functions, and their mixtures, which comprises using small amounts of a mixture which consists of at least one acid and at least one salt of an acid as a catalyst.

In the process, the Si—H bonds are partly or fully replaced by alkoxide radicals of the alcohol without degrading the siloxane basic structure.

Surprisingly, the mixtures according to the invention, even in small amounts, exhibit high catalytic activity which ensures rapid and selective reaction, whereas, in contrast, neither the pure acid nor the pure salt in these amounts have a significant catalytic activity. The catalyst according to the invention enables the solvent-free conversion of polyorganohydrosiloxanes of the general formula (I) to substituted polyorganosiloxanes which are known per se or are novel. The catalyst is physiologically safe and can be easily filtered off after the reaction. Dispensing with solvent is economically and ecologically advantageous. In addition, this process does not decompose the siloxane basic structure.

It has been found that, surprisingly, when unsaturated alcohols are used, no reaction of the Si(H) function takes place at the double bond. In this way, unsaturated Si—O—C— bonded reaction products can be prepared.

Useful active catalysts in the context of the present invention are mixtures of at least one acid and at least one salt of an acid, preferably mixtures of at least one organic acid, for example a carboxylic acid, dithiocarboxylic acid, aryl-/alkylsulfonic acid, aryl-/alkylphosphonic acid or aryl-/alkylsulfinic acid and at least one metal or ammonium salt of an organic acid, in which the metal cation may be mono- or polyvalent. The ratio of salt to acid may be varied within wide ranges; preference is given to a ratio of acid to salt in the range from about 1:5 to about 5:1, in particular from about 2:3 to about 3:2, molar equivalents. In addition, polybasic acids or mixtures of mono- and polybasic acids, and also the corresponding salts with mono- or polyvalent cations may be used. The pKa value of the acid should not be negative, since equilibration of the siloxane basic structure otherwise results.

A particularly preferred embodiment of the invention consists in the use of catalytic systems consisting of about a 1:1 mixture of a carboxylic acid and its metal or ammonium salt, in which case the metal is a main group element or transition metal, more preferably a metal of the 1st and 2nd main group. The organic radical of the carboxylic acid is selected from cyclic, linear or branched, saturated, mono- or polyunsaturated alkyl, aryl, alkylaryl or arylalkyl radicals, preferably having from 1 to 40, in particular from 1 to 20, carbon atoms, haloalkyl groups having from 1 to 40 carbon atoms, hydroxyl-, carboxyl- or alkoxy-substituted alkyl, aryl, alkylaryl or arylalkyl radicals having from 1 to 40 carbon atoms.

Preference is given in particular to those systems whose carboxylic acid is selected from: formic acid, acetic acid, propionic acid, butyric acid, valeric acid, caproic acid, oenanthoic acid, caprylic acid, pelargonic acid, capric acid, undecanoic acid, lauric acid, myristic acid, palmitic acid, stearic acid, arachic acid, behenic acid, cyclopentane-carboxylic acid, cyclohexanecarboxylic acid, acrylic acid, methacrylic acid, vinylacetic acid, crotonic acid, 2-/3-/4-pentenoic acid, 2-/3-/4-/5-hexenoic acid, lauroleic acid, myristoleic acid, palmitoleic acid, oleic acid, gadoleic acid, sorbic acid, linoleic acid, linolenic acid, pivalic acid, ethoxyacetic acid, phenylacetic acid, lactic acid, hydroxycaproic acid, 2-ethylhexanoic acid, oxalic acid, malonic acid, succinic acid, malic acid, tartaric acid, citric acid, glutaric acid, adipic acid, pimelic acid, suberic acid, azelaic acid, sebacic acid, benzoic acid, o-/m-/p-tolylic acid, salicylic acid, 3-/4-hydroxybenzoic acid, phthalic acids, or their partly or fully hydrogenated derivatives such as hexahydro- or tetrahydrophthalic acid, or mixtures thereof.

In the process according to the invention, it is possible in principle to use any organic compound having alcoholic hydroxyl groups, including the diols, triols, polyols, amino alcohols and, for example, hydroxycarboxylic acids and their particular derivatives. Particular preference is given to ethanol and to propylene oxide- or ethylene oxide-functionalized polyether alcohols which have been started, for example, with butyl alcohol, allyl alcohol or nonylphenol.

The alcohol is preferably used in an equimolar amount or in excess; in the process according to the invention, preference is given to setting the ratio of SiH groups to alcohol groups within the range from about 1:1 to about 1:3 molar equivalents.

It is equally possible by the process according to the invention to prepare partially substituted polyorganosiloxanes which, in addition to the substituted Si—O—C units, also contain unconverted Si(H) units. To this end, the ratio of SiH groups to alcohol groups is set preferably within the range from about 1:0.1 to about 1:0.99 molar equivalents.

In order to suppress the side reaction of Si—H to Si—OH, it is advantageous to dry the alcohols used, especially when polyether alcohols are used, before use. This may be effected by known processes, for example by desiccants or vacuum distillation.

Polyorganosiloxanes used in the process according to the invention may be purely terminal, i.e. Si—H groups are disposed only at the end groups of the polysiloxane chain, purely lateral, i.e. Si—H groups are disposed only in the interior, but not at the end groups of the polysiloxane chain, or mixed.

In the same manner and with very particular preference, comb-like, α,ω-disubstituted and mixed polydimethylhydrosiloxanes of the general formula (I) may be used in the process according to the invention.

Very particular preference is given, for example, to using polyorganosiloxanes of the following formula (III):

$$M\text{-}O\text{-}D_x\text{-}D'_y\text{-}M \quad (III)$$

where
M is trialkylsilyl, in particular trimethylsilyl,
D is (dialkylsilyloxy) in particular (dimethylsilyloxy) and
D' is

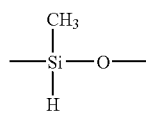

where x and y are previously defined.

Very particular preference is equally given, for example, to using polyorganosiloxanes of the following formula (IV):

$$M'\text{-}O\text{-}D_x\text{-}M' \quad (IV)$$

where
M' is dialkyl(hydro)silyl, in particular dimethylhydrosilyl and
D is (dialkylsilyloxy), in particular (dimethylsilyloxy)

where x and y are previously defined.

The process according to the invention can be carried out without solvent, which constitutes a considerable advantage from economic and ecological aspects compared to the prior art processes, especially for the industrial scale realization. In contrast to the prior art processes, for example starting from chlorosiloxanes, the polyorganosiloxanes which can be prepared in accordance with the invention and have been substituted by organyloxy groups and/or aminoorganyloxy groups are not contaminated with hydrochloric acid, hydrogen chloride or chlorides corresponding to their neutralization products, each of which stem from the substitution reaction. This considerably eases further processing or workup. For example, costly and inconvenient filtering off of the chloride-containing neutralization product, for example in the form of ammonium chloride, becomes unnecessary.

The process according to the invention therefore provides a technically simple route to preparing polyorganosiloxanes containing terminal and/or pendant Si—O—C bonded uniform or mixed radicals selected from linear or branched, saturated, mono- or polyunsaturated, aromatic, aliphatic-aromatic mono- or polyalcohols, polyethers, polyether alcohols or amino alcohols, in particular N-alkyl, arylamino-EO, —PO alcohols, N-alkyl or arylamino alcohols, each of which may optionally bear other functions, or mixtures thereof, and each of which are free of the impurities mentioned, in particular residual constituents of hydrochloric acid and neutralization products which contain chloride.

Particular preference is given to those polyorganosiloxanes in which the radicals are selected from simple alcohols such as methanol, ethanol etc., and butyl polyether and/or allyl polyether.

The polyorganosiloxanes according to the invention are useful for modifying textiles, as additives for plastics, coatings, printing inks and for cosmetic formulations, or in the architectural paints field and/or as polyurethane foam stabilizers.

The following non-limiting examples exemplify the present invention.

INVENTIVE EXAMPLES

1. Reaction of M'-O-$D_{13}$-M'-siloxane with a polyether using various catalyst mixtures:

The catalytic activity of the individual catalysts was checked using an α,ω-SiH-functional siloxane having an SiH value of 1.82 eq/kg, which corresponds to an average chain length of 15 (M'-O-$D_{13}$-M'). The alcohol used was a 10% by mass excess of a butanol-started polypropylene oxide polyether (average molar mass of 1 800 g/mol) having an OH number of 30 mg KOH/g, which corresponds to an average chain length of 30. The polyether was dried at 120° C. and 30 mbar while passing nitrogen through for 1 hour. All reactions were performed under protective gas. In the reaction, hydrogen formed and was removed via a bubble counter.

All the experiments were carried out by the same method.

Reaction Procedure:

The polyether is initially charged and stirred under nitrogen at reaction temperature for 30 min. After the catalyst mixture has been added, the mixture is stirred for a further 10 min. Subsequently, the SiH siloxane is added dropwise within 30 min and the mixture is stirred at reaction temperature until the evolution of hydrogen subsides. The progress, and also the end point, of the reaction is observed and determined by the determination of the residual SiH functions by means of volumetric determination of hydrogen gas. The catalyst mixture is removed by simple filtration through a fluted filter. This gives a colorless to slightly yellow liquid having a viscosity in the range from 370 to 410 mPas (Brookfield Viscometer). The end product is characterized by means of $^{29}$Si NMR, which demonstrates the selective formation of the SiOC bond.

The table which follows lists the catalysts used (1:1 mixture of acid and salt of the acid), the amount of catalyst (based on alcohol), the reaction temperature and the reaction time after which 100% conversion (SiH value=0 eq/kg of test substance) had been achieved.

| Catalyst | Mol % | T [° C.] | t [h] |
| --- | --- | --- | --- |
| Formic acid/cesium formate | 5 | 120 | 8 |
| Acetic acid/potassium acetate | 5 | 120 | 8 |
| Acetic acid/cesium acetate | 2.5 | 120 | 10 |
| Lactic acid/potassium lactate | 5.2 | 110 | 8 |
| 2-Ethylhexanoic acid/potassium 2-ethylhexanoate | 2.5 | 110 | 6 |
| 2-Ethylhexanoic acid/cesium 2-ethylhexanoate | 2.5 | 120 | 5 |
| 2-Ethylhexanoic acid/cesium 2-ethylhexanoate | 5 | 120 | 4 |
| Lauric acid/potassium laurate | 5 | 120 | 8 |
| Lauric acid/cesium laurate | 2.5 | 120 | 6 |
| Oleic acid/cesium oleate | 2.5 | 120 | 4 |
| Benzoic acid/cesium benzoate | 2.5 | 120 | 11 |
| o-Tolylic acid/cesium salt of o-tolylic acid | 2.5 | 120 | 7 |
| Coconut fatty acid (cut)/cesium salt of coconut fatty acid | 2.5 | 120 | 4 |

2. Reaction of M'-O-D$_{13}$-M'-siloxane with a diol (α,ω-hydroxy-functionalized polyether) using benzoic acid/cesium benzoate:

An α,ω-SiH functional siloxane having an SiH value of 1.82 eq/kg, which corresponds to an average chain length of 15 (M'-O-D$_{13}$-M'), was reacted with a propylene glycol-started polyether (average molar mass of 2 200 g/mol) which contained 90% of propylene oxide (remainder ethylene oxide) which had an OH number of 47 mg KOH/g. The ratio of α,ω-SiH siloxane to α,ω-hydroxy-functionalized polyether used was 4:5 molar equivalents. The polyether was dried at 120° C. and 30 mbar while passing nitrogen through for 1 hour. The polyether was initially charged and stirred under nitrogen at 120° C. for 30 min. After 2.5 mol % (based on alcohol) of a 1:1 mixture of benzoic acid and cesium benzoate had been added, the mixture was stirred for a further 10 min and the SiH siloxane was subsequently added dropwise within 30 min. The reaction mixture was stirred at 120° C. until the SiH content was 0 after 3 hours. The reaction mixture was admixed with 2.1% by mass (based on the total mass) of isopropanol. After stirring at 130° C. for 3 hours, the excess of isopropanol was removed by distillation under reduced pressure. The catalyst mixture was removed by simple filtration through a fluted filter. This gave a colorless liquid having a viscosity of 1 400 mPas (Brookfield Viscometer).

The end product was characterized by means of $^{29}$Si NMR, which demonstrates the selectivity of the SiOC bond formation.

3. Reaction of M'-O-D$_{13}$-M'-siloxane with an allyl alcohol-started polyether using lauric acid/cesium laurate:

An α,ω-SiH-functional siloxane having an SiH value of 1.82 eq/kg, which corresponds to an average chain length of 15 (M'-O-D$_{13}$-M'), was reacted with an allyl alcohol-started polypropylene oxide polyether (average molar mass 400 g/mol) having an iodine number of 63 g of iodine/100 g of test substance. The polyether was used in a 10% by mass excess. The polyether was dried at 120° C. and 30 mbar while passing nitrogen through for 1 hour. The polyether was initially charged and stirred under nitrogen at 120° C. for 30 min. After 2.5 mol % (based on alcohol) of a 1:1 mixture of lauric acid and cesium laurate had been added, the mixture was stirred for a further 10 min and the SiH siloxane was subsequently added dropwise within 30 min. After stirring at 120° C. for 3 hours, an SiH value of 0 was achieved. The catalyst mixture was removed by simple filtration through a fluted filter. The filtrate had an iodine number of 28 (theoretical iodine number 29 corresponding entirely to double bonds present). The end product was characterized by means of $^{29}$Si NMR, which demonstrated the selective SiOC bond formation while retaining the double bonds.

The above description of the invention is intended to be illustrative and not limiting. Various changes or modifications in the embodiments described herein may occur to those skilled in the art. These changes can be made without departing from the scope of the invention.

What is claimed is:

1. A process for preparing alkoxy-modified polyorganosiloxanes which comprises reacting A) at least one polyorganosiloxane of the formula

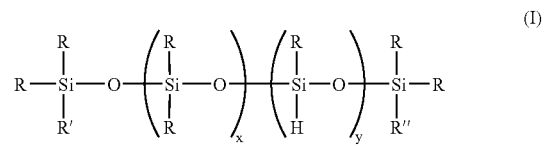

wherein
R is one or more identical or different radicals selected from linear or branched, saturated, mono- or polyunsaturated alkyl, aryl, alkylaryl and arylalkyl radicals, each of which may be optionally substituted by haloalkyl groups, siloxy groups or triorganosiloxy groups,
R' and R" are each independently H or R,
x is an integer from 0 to 300,
y independently thereof, is an integer from 0 to 80;
wherein said polyorganosiloxane has at least one —Si(H) unit
with
B) at least one alcohol selected from the group consisting of a saturated aliphatic alcohol, a saturated aromatic alcohol, a polyuaturated aliphatic alcohol, saturated aromatic polyalcohol, a saturated aliphatic polyalcohol, a monounsaturated aromatic alcohol, a monounsaturated aliphatic alcohol, a polyunsaturated aromatic alcohol, a polyunsaturated aliphatic alcohol, a monounsaturated aromatic polyalcohol, a monounsaturated aliphatic polyalcohol, a polyunsaturated aromatic polyalcohol, a polyunsaturated aliphatic polyalcohol, a polyether monoalcohol, a polyether polyalcohol, an aminoalcohol, and a mixture of said alcohols,
in the presence of a catalyst which consists of a mixture of at least one acid and at least one salt of an acid and, optionally a solvent.

2. The process according to claim 1 wherein
R is one or more identical or different radicals selected from linear or branched, saturated, mono- or polyunsaturated $C_1$–$C_{20}$ alkyl, $C_1$–$C_{20}$ aryl, $C_1$–$C_{20}$ alkylaryl and $C_1$–$C_{20}$ arylalkyl radicals, each of which is optionally substituted by $C_1$–$C_{20}$ haloalkyl groups, siloxy groups and/or triorganosiloxy groups,
R' and R" are each independently H or R,
x is an integer from 0 to 300,
y independently thereof, is an integer from 0 to 80.

3. The process according to claim 1, wherein the alcohol is an N-alkyl alcohol, an arylamino alcohol, a polyoxyalkylene alcohol arylamino EO-alcohol, an arylamino PO-alcohol, or an N-alkylamino alcohol.

4. The process according to claim 1, wherein the pKa value of the acid is not negative.

5. The process according to one of claim 1, wherein the ratio of acid to salt in the catalyst from about 1:5 to about 5:1 molar equivalents.

6. The process according to claim 1, wherein the ratio of acid to salt in the catalyst is about 1:1.

7. The process according to claim 1, wherein the catalyst consists of at least one organic acid and at least one salt of an organic acid.

8. The process according to claim 7, wherein the organic acid is a carboxylic acid.

9. The process according to claim 7, wherein the salt of the organic acid is the salt of a carboxylic acid.

10. The process according to claim 8 wherein the carboxylic acid is selected from the group consisting of:
formic acid, acetic acid, propionic acid, butyric acid, valeric acid, caproic acid, heptanoic acid, caprylic acid, nonanoic acid, capric acid, undecanoic acid, lauric acid, myristic acid, palmitic acid, stearic acid, arachic acid, behenic acid, cyclopentanecarboxylic acid, cyclohexanecarboxylic acid, acrylic acid, methacrylic acid, vinylacetic acid, crotonic acid, 2-/3-/4-pentenoic acid, 2-/3-/4-/5-hexenoic acid, lauroleic acid, myristoleic acid, palmitoleic acid, oleic acid, gadoleic acid, sorbic acid, linoleic acid, linolenic acid, pivalic acid, ethoxyacetic acid, phenylacetic acid, lactic acid, 2-ethylhexanoic acid, oxalic acid, malonic acid, succinic acid, tartaric acid, glutaric acid, adipic acid, pimelic acid, suberic acid, azelaic acid, sebacic acid, benzoic acid, o-/m-/p-tolylic acid, salicylic acid, 3-/4-hydroxybenzoic acid, phthalic acids, partly or fully hydrogenated phthalic acid derivatives and mixtures thereof.

11. The process according to claim 1, wherein the salt is an ammonium or a metal salt.

12. The process according to claim 11, wherein the metal is an element of the 1 st and 2 nd main group.

13. The process according to claim 1, wherein the alcohol is methanol, ethanol, butyl polyether alcohols, allyl polyether alcohols, nonylphenyl polyether alcohols, polyether derived from styrene/butene oxide, or a mixture of two or more of the foregoing.

14. The process according to claim 1, wherein the ratio of SiH groups to alcohol groups in the range from about 1:1 to about 1:3 molar equivalents.

15. The process according to claim 1, wherein the ratio of SiH groups to alcohol groups is in the range from about 1:0.1 to about 1:0.99 molar equivalents.

16. The process according to claim 1, wherein the polyorganosiloxanes are terminal SiH-polyorganosiloxanes.

17. The process according to claim 1, wherein the polyorganosiloxanes are pendant or simultaneously pendant and terminal (mixed) SiH polyorganosiloxanes.

18. The process according to claim 1, wherein the polysiloxanes are compounds selected from the group of comb-like, α,ω-disubstituted and mixed polydimethylhydrosiloxanes of the general formula (I).

19. The process according to claim 16, wherein polyorganosiloxanes are selected from the polysiloxane of the formula (IV):

$$M'\text{-O-}D_x\text{-}M' \qquad (IV)$$

where
M' is dialkyl(hydro)silyl,
D is (dialkylsilyloxy), and
x is an integer from 0 to 300.

20. The process according to claim 19 where M' is dimethylhydrosilyl and D is dimethylsiloxy.

21. The process of claim 17, wherein polyorganosiloxanes are used which are selected from the group of the formula (III):

$$M\text{-O-}D_x\text{-}D'_y\text{-}M \qquad (III)$$

where
M is trialkylsilyl,
D is (dialkylsilyloxy),
D' is

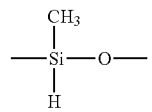

x is an integer from 0 to 300, and
y independents thereof is an integer from 0 to 80.

22. The process according to claim 21, wherein the M is trimethylsilyl and D is dimethylsilyloxy.

23. The process according to claim 1, wherein the process does not contain a solvent.

24. The process according to claim 1, wherein the catalyst mixture is selected from the group consisting of formic acid/cesium formate, acetic acid/potassium acetate, acetic acid/cesium acetate, lactic acid/potassium lactate, 2-ethylhexonic acid/cesium 2-ethylhexanoate, 2-ethylhexanoic acid/cesium 2-ethylhexanoate, lauric acid/potassium laurate, lauric acid/cesium laurate, oleic acid/cesium oleate, benzoic acid/cesium benzoate, and o-tolylic acid/cesium salt of o-tolylic acid.

* * * * *